March 9, 1965    D. F. BOWMAN    3,173,145
CONICAL SCANNING PRODUCED BY A.M. MODULATOR
FEEDING PLURAL HORNS WITH REFLECTOR
Filed Dec. 17, 1962    5 Sheets-Sheet 1
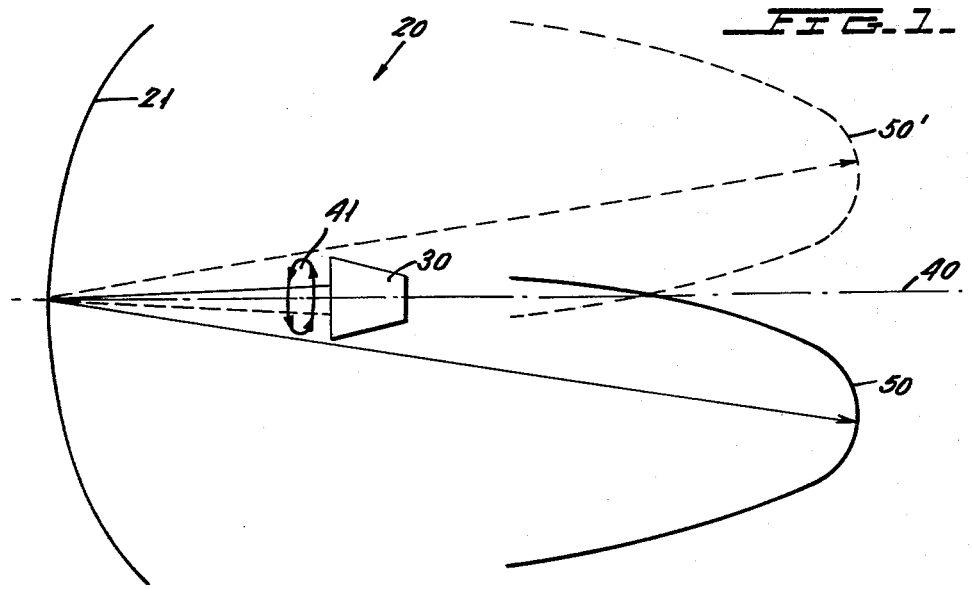
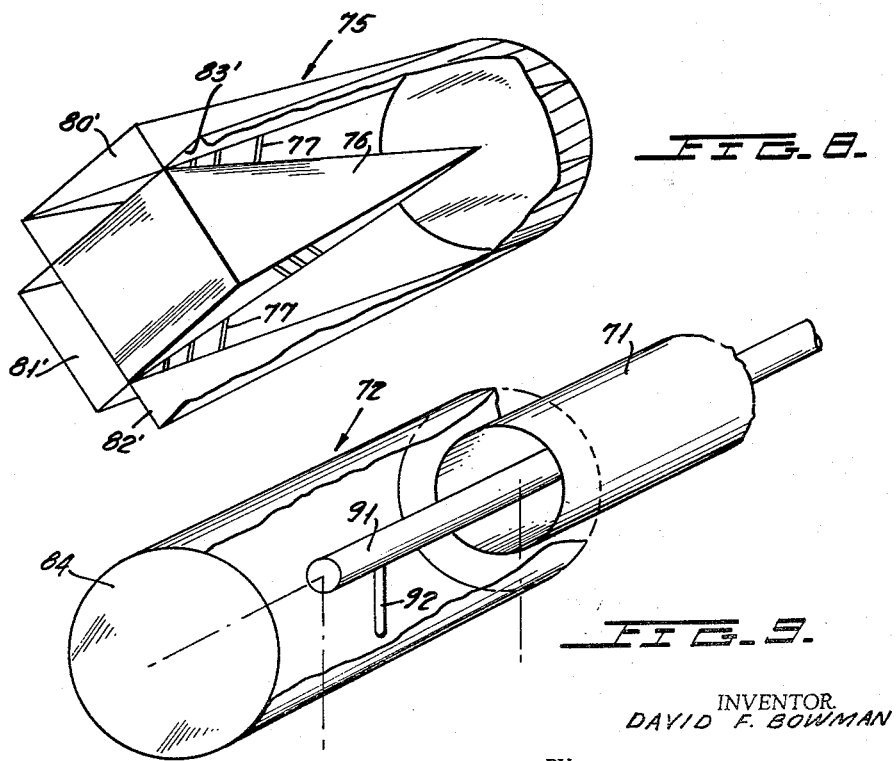
INVENTOR.
DAVID F. BOWMAN
BY
OSTROLENK, FABER, GERB & SOFFEN
ATTORNEYS March 9, 1965  D. F. BOWMAN  3,173,145
CONICAL SCANNING PRODUCED BY A.M. MODULATOR
FEEDING PLURAL HORNS WITH REFLECTOR
Filed Dec. 17, 1962  5 Sheets-Sheet 2
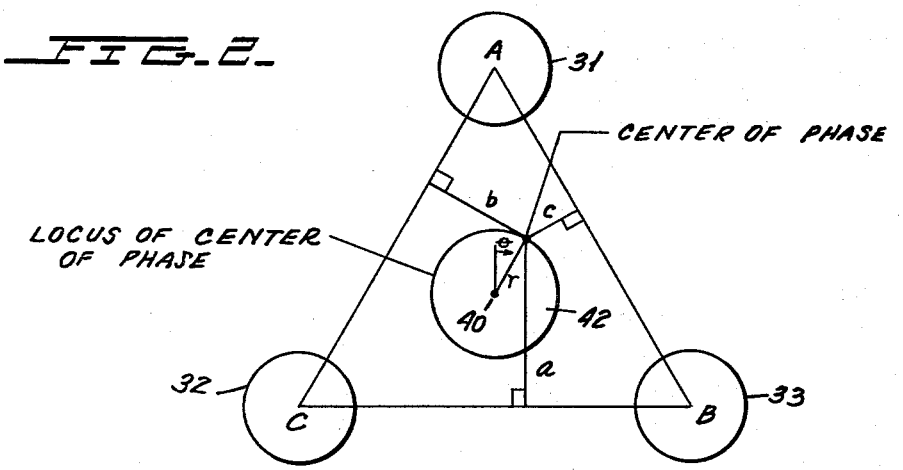
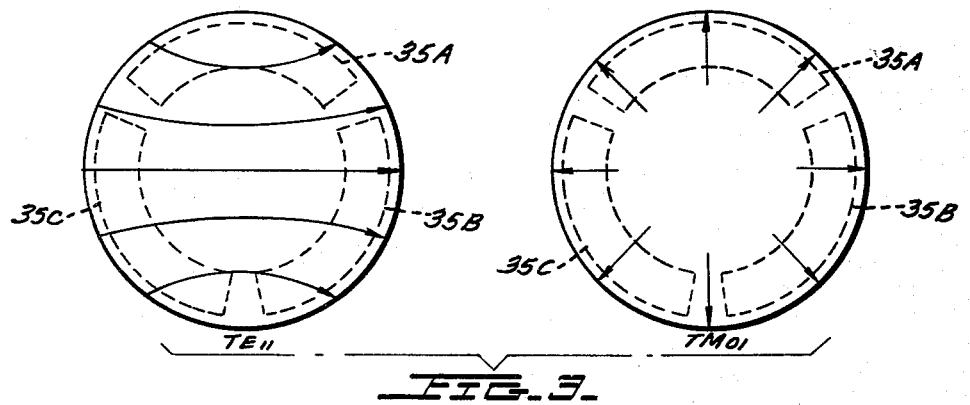
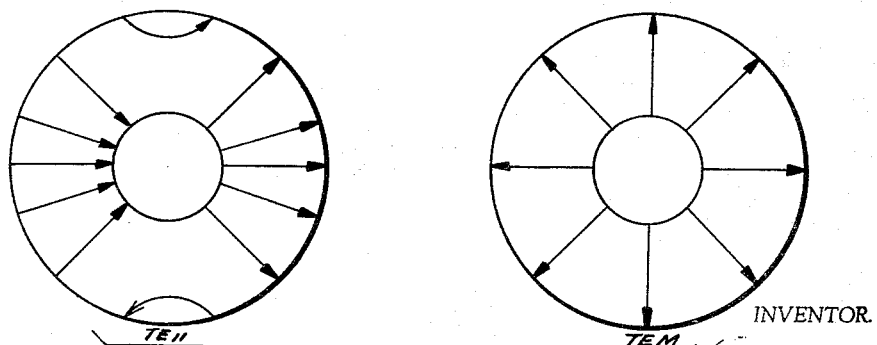
INVENTOR.
DAVID F. BOWMAN
BY
OSTROLENK, FABER, GERB & SOFFEN
ATTORNEYS

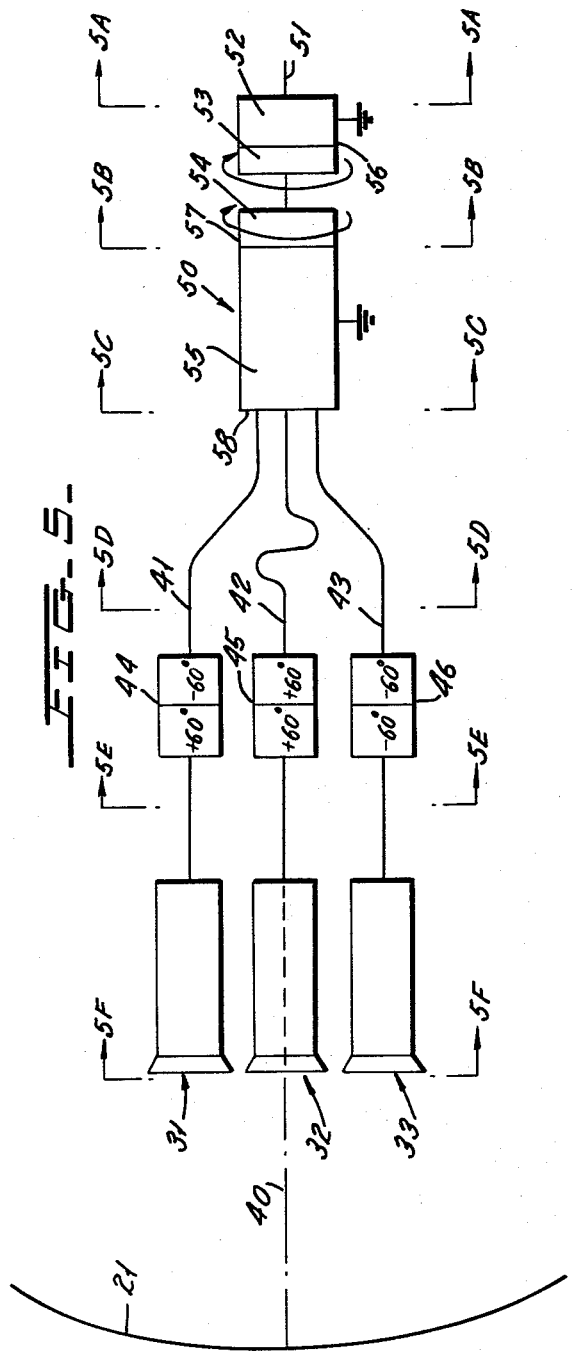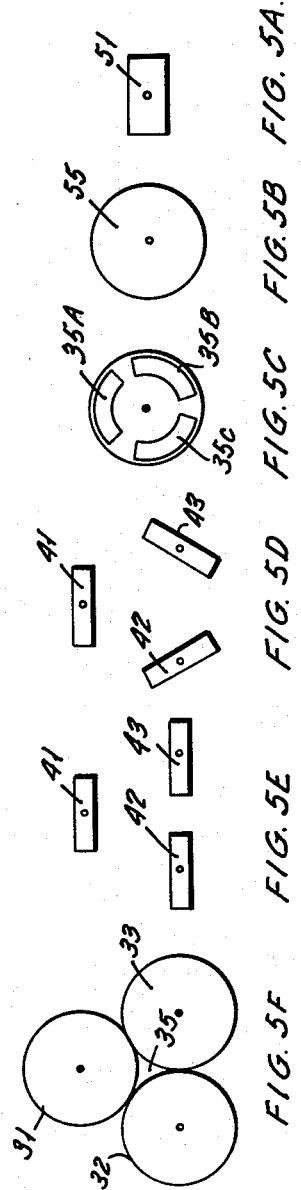

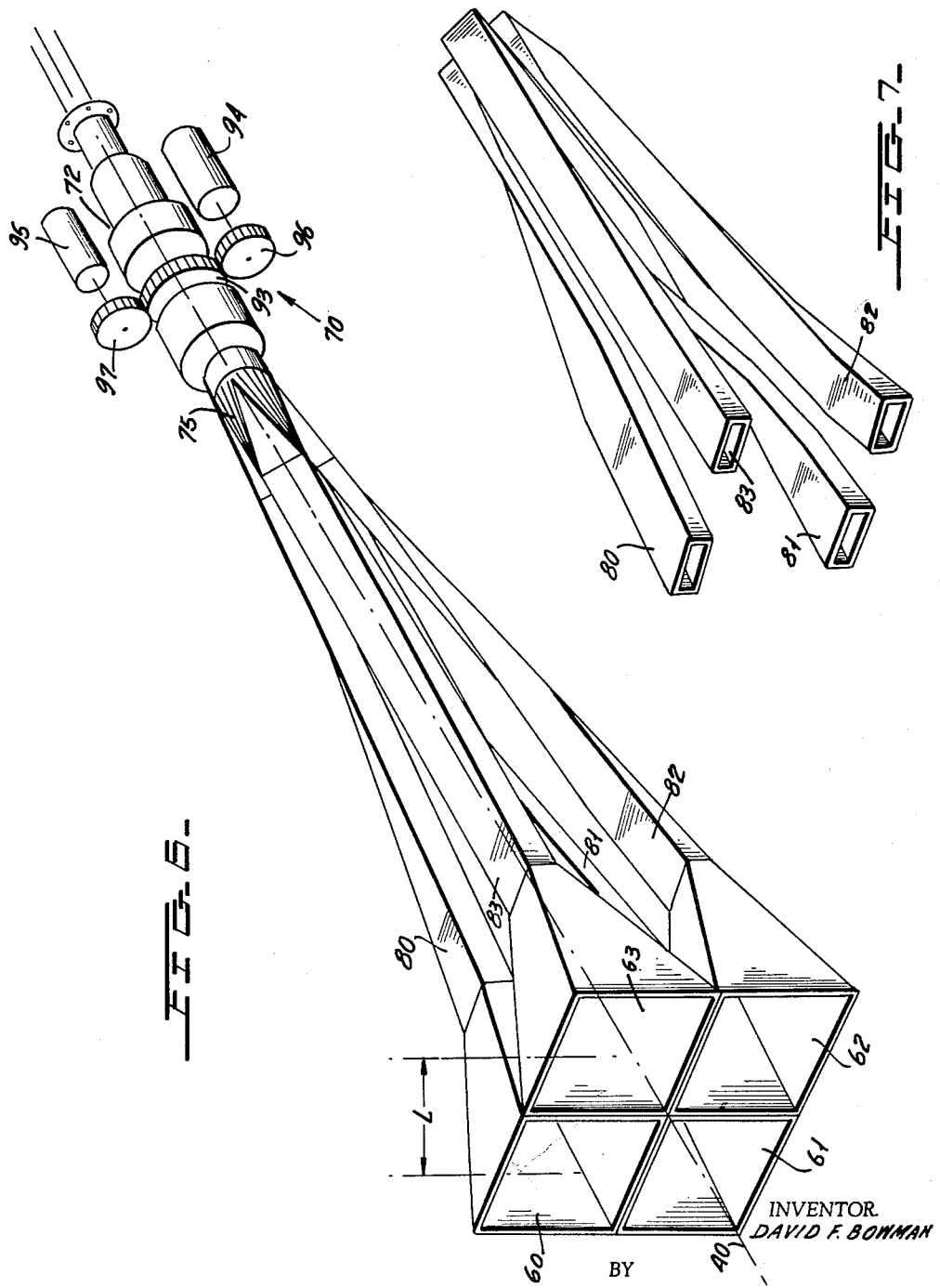

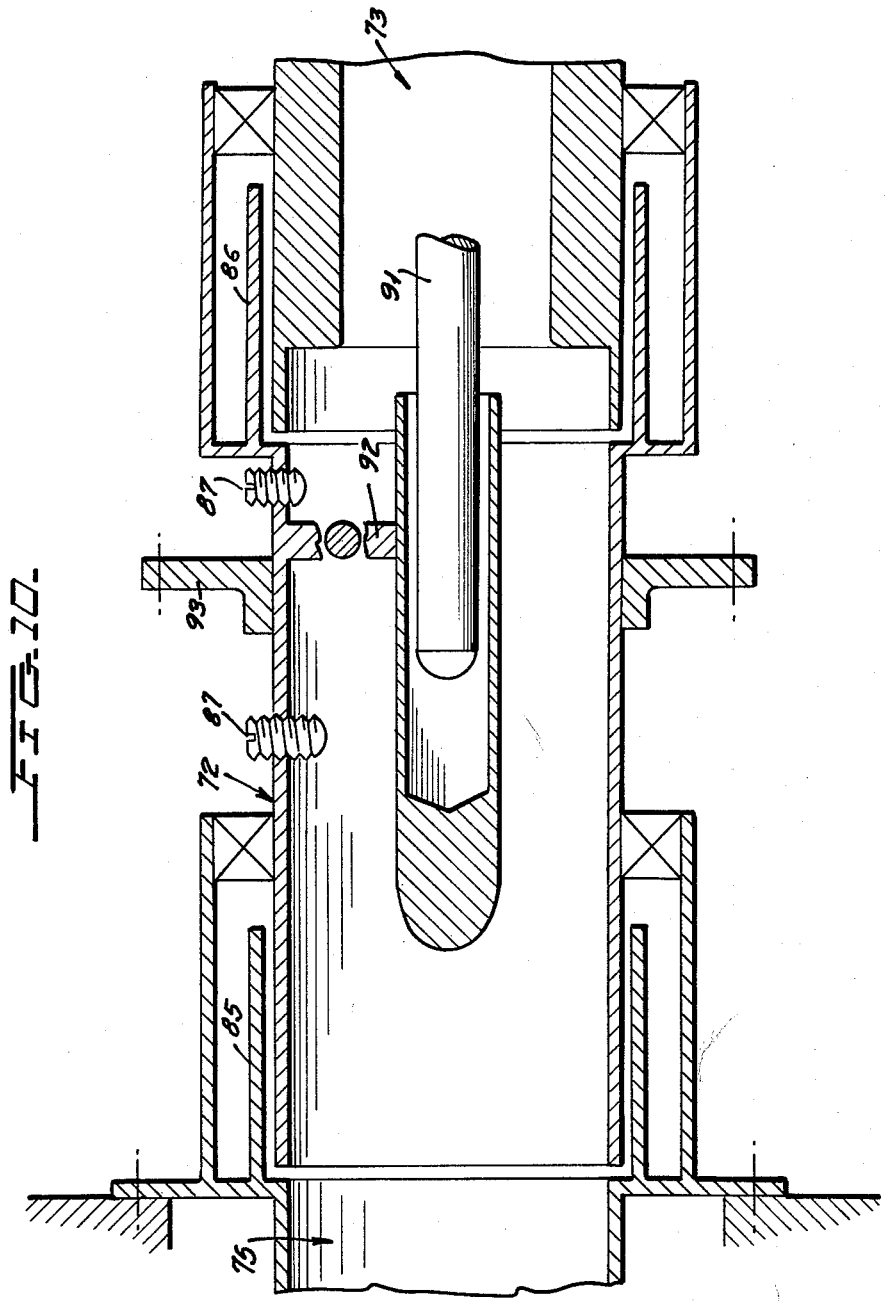

United States Patent Office 3,173,145
Patented Mar. 9, 1965

3,173,145
CONICAL SCANNING PRODUCED BY A.M. MODULATOR FEEDING PLURAL HORNS WITH REFLECTOR
David F. Bowman, Wayne, Pa., assignor to I-T-E Circuit Breaker Company, Philadelphia, Pa., a corporation of Pennsylvania
Filed Dec. 17, 1962, Ser. No. 245,021
4 Claims. (Cl. 343—777)

My invention relates to an antenna conical feed and more particularly to a novel arrangement for interconnecting a wave signal to an array of stationary feed radiators to electrically move the signal phase center about the reflector axis.

Conically scanned antenna beams are used in radar systems to accurately determine the angular direction of a target. Such systems generally include a means for rotating the phase center of an antenna beam about the principal axis of the antenna system, such that the relative signal return of the off axis beams permits precise angular measurement.

One well known method of obtaining such a conically scanned beam utilizes a feed horn slightly off center with respect to the principal axis of a parabolic reflector. Rotation of the horn about the principal axis in a small circle concentric with the focus of the reflector will similarly rotate the axis of directivity of the secondary beam to provide for conical scanning. Because of system inertia and other mechanical difficulties, encountered with movement of the feed itself, such prior art systems have been severely limited as to scanning rates and accuracy.

Another method, commonly referred to as the Tripole Scanner, utilizes phase varying signal components of a preferred polarization, such as horizontally polarized waves. These components are provided by three angularly separated coupling slots in a rotating cap at the output aperture region of the feed horn; the feed horn being fed with an angularly varying mode such as the $TE_{11}$ mode. The reflector itself is constructed to substantially reflect only the preferably polarized components of the illuminating signal. The phase varying components provided by the rotating cap arrangement at the feed combine in their preferable polarization to rotate the center of phase about the principal axis in a manner determined by the rotational speed of the cap and the geometric positioning of the slots within the cap. This method disadvantageously radiates only a portion of the energy which is polarized in the preferable direction; requires the cumbersome rotation of members at the antenna feed; and limits the scan movement to the rotating cap structure.

My invention avoids the limitation of the prior art devices by providing a simplified and more versatile system for electrically rotating the phase center of the feed signal about the reflector focus. In accordance with my invention, the illuminating feed comprises a plurality of identically constructed radiating elements, such as horns, symmetrically disposed about the reflector axis. Three of such horns may, for example, be arrayed at the corners of an equilateral triangle, or alternatively four horns may be nested together to form a rectangular region at their output aperture. As a particularly advantageous feature of the instant invention, these radiating elements located at the feed portion of the antenna system, are fixedly positioned and do not require any rotating or otherwise moving members.

The horns are fed in phase by individual but sequentially related wave signals having a time varying amplitude component such that the phase center of the signal additionally formed travels about a circular locus centered at the principal axis of the antenna system. Accordingly, such circular locus established by the time modulated power division of the individual signals, will coact with a conventional reflector (such as a parabolic reflector) to angularly displace the secondary beam from the reflector axis, therefore providing conical scanning.

The useful energy of the conical beam will include substantially all the energy available at the source feed, and is not limited to a preferably polarized component thereof, as in the tripole scanner arrangements. Preferably the individual horn radiators located at the focal region may be circularly polarized to provide signal transmission of the type particularly advantageous in conjunction with satellite communication. Also, although the instant discussion is chiefly concerned with the transmit mode, the antenna arrangement is equally adaptable for signal reception.

The individual amplitude modulated signals presented to each of the feed horns are preferably obtained by an arrangement rotatively coupling to the annular region of a dual mode signal; one of the modes having a cosinusoidal variation in radial fields with angle around the circumference and the other mode exhibiting a constant radial field with such angular variation. Individual coupling means are symmetrically placed about the annular region and rotatively moved to provide signals having a constant amplitude term and an amplitude modulated term varying with the angular direction of the coupling means. The coupling means are preferably angularly separated about the field of the dual mode signal, in the same manner that their associated feed horns are arranged about the antenna axis. These signals are then coupled to the feed horns by electrically identical wave guides to provide in-phase radiation, each of a time varying amplitude but having a constant sum. The electrical phase center of the constant sum additive signal rotates about the antenna focus at a rate determined by the rotational movement of the amplitude modulator. The radius of such rotation is proportionally related to the ratio between the constant and amplitude modulated components of the feed signal.

Accordingly it is a primary object of my invention to provide a simplified conical scanning feed of increased versatility.

Another object of my invention is to provide a conically scanned antenna beam by electrically rotating the phase center of a signal presented to a plurality of radiating elements stationary about the antenna axis.

A further object of my invention is to provide such a conical scan antenna system wherein individual feed horns are fed with time modulated wave signals sequentially related to combinedly effect rotation of their phase center about the antenna axis.

An additional object of my invention is to provide such an antenna system wherein the feed radiators may be circularly or linearly polarized, with substantially all of their energy being radiated by the conical scanned beam.

Still another object of my invention is to interconnect the individual feed radiators to angularly separated coupling means rotatively associtaed with a dual mode signal.

Still a further object of my invention is to provide such an antenna system amplitude modulating means wherein one of the dual modes exhibits a variation in radial field with angle around the circumference and the other of the dual modes exhibits a substantially constant radial field with such angular variation.

Still an additional object is to provide such conical scanning wherein the radius of scan is proportional to the amplitude ratio of the dual modes.

These as well as other objects of my invention will readily become apparent after reading the following descriptions of the accompanying drawings in which:

FIGURE 1 schematically shows the manner of obtaining a conically scanned antenna beam with a stationary reflector.

FIGURE 2 shows the basic signal combining operation of my invention to effect movement of the electrical phase center.

FIGURES 3 and 4 show the $TE_{11}$ and $TM_{01}$ mode in hollow circular wave guides and the $TE_{11}$ and TEM mode in coaxial wave guides. These modes may provide the requisite dual mode propagation in the amplitude modulator to effect wave signal amplitude variation in accordance with the preferred teachings of my invention.

FIGURE 5 schematically shows one embodiment of an antenna system constructed in accordance with my invention, with cross-sectional views 5A–5F as indicated by arrows A–F respectively.

FIGURE 6 shows a perspective view of the feed and amplitude modulating portions of another embodiment of my invention.

FIGURE 7 illustrates a preferred arrangement of the connecting guides between the amplitude modulator and the feed horns of FIGURE 6.

FIGURE 8 shows a portion of the amplitude modulating means of FIGURE 6 for coupling the dual mode signal to a symmetric array of four feed horns in a manner providing the proper sequential timing between the individual wave signals.

FIGURE 9 is a simplified perspective view, partially cut away, showing an exemplary mode converter which may be used to excite the requisite dual mode propagation in the amplitude modulator.

FIGURE 10 is a cross-sectional view of the rotating region of the amplitude modulator of FIGURES 6–9.

Referring to FIGURE 1 antenna system 20 includes a reflecting surface 21 and a feed 30). Surface 21 may typically be a paraboloid of revolution constructed to substantially reflect all of the energy supplied by feed 30. Feed 30 is positioned along the principal axis 40 of reflecting surface 21 such that rotation of its electrical phase center circularly about the axis 40, as shown by arrow 41, will rotate the secondary beam to provide conical scanning between the angular extremes generally shown by radiation patterns 50, 50′.

It is understandably desirable to provide such rotation of the electrical phase center without actually rotating feed 30 or other mechanical components located at the focal region of the reflector. Such electrical rotation is preferably obtained in accordance with the teachings of my invention by the presentation of sequentially related amplitude modulated signals to individual horn radiators fixedly positioned in a symmetric array about the focal region. Such horn radiators may be three in number and located at the corners of an equilateral triangle centered about 40, as generally shown in FIGURE 2. Horns 31, 32, 33 are constructed to properly illuminate the reflector surface 21, and may for example present circularly polarized wave signals A, B, C. The required amplitude variation of the individual signals to additively effect a circular locus of the electrical phase center may be analogized to finding the center of gravity of three such weights, A, B and C. The respective moment arms may be represented by the expressions:

(1) $a = \frac{1}{3} + r \cos \theta$
(2) $b = \frac{1}{3} + r \cos(\theta - 120°)$ and
(3) $c = \frac{1}{3} + r \cos(\theta - 240°)$ The solution to provide movement of the center of gravity about the circular locus shown by 42 is (4) $A = a(A+B+C)$
(5) $B = b(A+B+C)$ and
(6) $C = c(A+B+C)$ The expression for the relative amplitudes of the individual signals A, B, C may therefore be generally represented as (7) $\frac{1}{3} + r \cos(\theta + n \times 120°)$ Thus, to obtain the requisite electrical phase rotation, the individual signals include a constant term and amplitude varying term, the latter exhibiting a cosinusoidal variation. Further, the magnitude ratio between the amplitude varying term and the constant term determines the radius $r$ of locus 42.

The necessary constant and cosinusoidal varying components of the wave signals presented to feed horns 31, 32, 33 is preferably provided by a rotary coupling to a dual mode wave, of the type shown in FIGURES 3 and 4. Referring to FIGURE 3, the $TE_{11}$ mode is seen to have a variation in radial field with angle about its circumferential region which will yield the necessary cosinusoidal variations in amplitude. Similarly the $TM_{01}$ mode will provide the constant amplitude term. Such coupling is provided by symmetrically placed couplers in the circumferential region of the dual mode field, such as apertures 35A–C, shown dotted. Alternatively, other coupling means, such as probes, may be used. The symmetric angular placement of the coupling means corresponds to the location of their associated radiators about the antenna axis. Rotation of the dual mode field relative to the coupling means will provide sequentially related signals satisfying the condition given above in Equations 1 through 7. Alternatively, the dual mode field of FIGURE 4 may be employed in conjunction with the annularly spaced coupling means 35A–C.

Reference is now made to FIGURE 5 which schematically illustrates the overall antenna system. Horns 31–33 are symmetrically arrayed about principal axis 40 to form the equilateral arrangement generally shown in FIGURE 5F. Such a three horn nesting arrangement preferably provides an intermediate area 35 along the axial region 40 which may include another feed (not shown) providing a stationary antenna beam. Amplitude modulator 50 is connected to horns 31–33 by wave guides 41–43 respectively. In order to provide phase coincidence of the wave signals presented to horns 31–33, connecting guides 41–43 are presented in parallel relationship to the input end of the horns, as shown in FIGURE 5E. This requires twist sections 44–46 respectively, to alter their 120° separation (as shown in cross-section 5D) to parallel arrangement (as shown in cross-section 5E). To insure a high degree of electrical equivalence among the three connecting guides 41–43, similar twist sections are included in each of the guides. These twist sections may for example be Wheeler step twists having a +60° and −60° section. Branch 41 is shown to have a +60° section and a −60° section giving a net mechanical rotation of zero. The other branches include either two +60° sections or two −60° sections to therefore provide the parallel disposition of the connecting guides 41, 42, 43, presented to the feed horns.

Amplitude modulator 50 includes an input channel at 51, shown in cross-section 5A as being a rectangular wave guide preferably dimensioned to propogate the $TE_{10}$ mode. Input 51 may alternatively be supplied by coax waveguide propagating the pure TEM mode. Circular guide section 52 is suitably interconnected to input 51 to excite the dual mode propagation shown in either FIGURE 3 or 4. Centrally disposed rotating guides 53, 54 rotate as shown by the arrows. Guides 54 are dimensioned to support the dual modes of FIGURE 3 or 4, and are suitably interconnected to end stationary guides 52, 55 as by suitably constructed non-contacting resonant chokes located at regions 56, 57 respectively. Stationary guide 55 will therefore contain a dual mode wave signal, the field of which will be rotating at a speed determined by the rotational speed of central members 53, 54. Circular guide 55 includes angularly separated coupling slots 35A, 35B, 35C, as shown by FIGURE 5C. These slots couple the rotating dual mode field into separate wave guides 41, 42, 43 appropriately connected to feed horns 31, 32, 33 respectively. Each slot couples 120° separated radial components of the field established by the rotating dual mode field. This 120° spacing therefore properly relates the varying individual wave signals of each of the feed horns to satisfy Equations 1 through 7. The constant term is provided by the $TM_{01}$ mode and the cosinusoidally varying term is provided by the rotating $TE_{11}$ mode. (Alternatively, these components may be provided by the TEM and $TE_{11}$ mode in coax under those systems utilizing the dual mode excitation of FIGURE 4.)

It is to be noted that my invention advantageously avoids the necessity of rotating the horns themselves, or of components located at the antenna feed. The operation of the system is substantially simplified by limiting such rotation to the amplitude modulator 50 which may be remote from the feed region of the reflector.

Reference is now made to FIGURES 6–10 which show another embodiment of my invention, utilizing a nested array of four linearly polarized horns 60–63 symmetrically placed at the feed of the antenna. The horns 60–63 are fed sequentially related time modulated signals by amplitude modulator 70, to provide electrical rotation of the signal phase center. For purposes of simplicity, the reflecting surface, which may be of a conventional design, is not shown. It is naturally understood that the number of individual horn radiators employed will be determined by the requirements imposed by the secondary reflector system and the convenience of horn nesting. Amplitude modulator 70 presents interrelated signals to horns 60–63 having constant and cosinusoidally varying components, the latter components of respective ones of the horns having a 90° separation. In a manner similar to that shown in FIGURE 2, the sequentially related signals presented to horns 60–63 will additively combine to rotate the phase center about the principal axis 40 of the antenna system. Further, the radius about which the phase center moves will be equal to $$(8) \quad \sqrt{2}/4 \times kL$$

where L is the spacing of the individual horn centers (as shown in FIGURE 6) and $k$ is the ratio of the maximum magnitudes of the constant and amplitude varying terms of the wave signals.

Feed horn radiators 60–63 are connected to the amplitude modulating means 70 by electrically identical wave guide sections 80–83 including 45° and 135° twist sections to provide parallel arrangement of the wave guides at their feed region end. A preferable cluster arrangement of the wave guides 80–83 is shown in FIGURE 7.

FIGURE 8 is a cutaway perspective view of output transitional section 85 of the amplitude modulating means 70. This section roughly corresponds to wave guide portion 55 shown in FIGURE 5 and includes a central pyramidal member 76 to couple the rotating dual mode field to the angularly displaced output ports 80', 81', 82', 83' which couple to connecting guides 80–83 respectively. Inductive posts 77 may also be provided for improved impedance match. Accordingly, the cosinusoidal amplitude varying terms coupled to each of the feed horns 60–63 will include 90° separated terms synchronously varying with the angular orientation of the dual mode field.

The central section 72 of the amplitude modulating means 70 is rotated by drive gear 93 circumferentially disposed thereabout. Drive gear 93 is controllably rotated by motor 94 and synchro 95 interconnected by intermediate gears 96, 97 respectively. The controlled rotation of central member 72 effects rotation of the dual mode field presenting to transitional output section 85, providing amplitude variation of the coupled signals for synchronous conical scanning of the secondary beam.

FIGURE 9 is a partial cross-sectional view through input member 72 of the amplitude modulating means 70. For purposes of simplicity, the rotary drive and choke couplers are not shown. This figure shows an exemplary manner of converting the pure TEM mode in input coax line 71 to first coax supported dual TEM and $TE_{11}$ mode, and then to a $TE_{11}$ and $TM_{01}$ dual mode supported in hollow wave guide. The extension of central conductor 91 of the coax into the input portion of guide 72 provides coupling of the TEM modes therein. Inductive bar 92 in shunt relationhip with the coax line converts a selected portion of the TEM mode into a $TE_{11}$ mode, therefore providing dual mode propagation in the input end of guide 72. The coax region at the input end of the guide converts to a hollow wave guide of circular cross-section at the output region 84, of suitable cross-section to support the $TE_{11}$ and $TM_{01}$ modes as shown in FIGURE 3.

Reference is now made to FIGURE 10 which shows a cross-sectional view through the central rotating member 72. Member 72 is interconnected to stationary members 73, 75 by choke and bearing assemblies 85, 86 respectively. Tuning screws 87 are also shown to provide good impedance match and selectively adjust the magnitude ratio between the dual signal modes.

It is thus seen that my invention provides a conical scanning arrangement for an antenna system which advantageously effects rotation of the electrical phase center of the illuminating signal without requiring the rotation of the reflecting surface or the feed horns themselves. Further, the degree of such rotation, and hence conical scan, may be selectively adjusted by varying the ratio of magnitudes between a dual mode signal presented in a region remote to the antenna feed; substantially all the energy received by the feed (which energy may preferably be circularly polarized) is radiated by the conically scanned beam; and the rotational speed of the conical scan may be synchronously related to the radar system. It is naturally understood that the basic concept of my invention may be utilized in various other beam scanning arrangements for both signal transmission and reception. Thus, I prefer not to be bound by the disclosure herein, but only by the appended claims.

I claim:

1. A conical scan antenna system comprising a plurality of radiating elements fixedly positioned in a predetermined array; amplitude modulating means providing a plurality of wave signals, each having a time varying amplitude component; connecting means interconnecting individual ones of said plurality of wave signals between said radiating elements and amplitude modulating means; said radiating elements presenting said wave signals about a region central of said predetermined array; said wave signals operatively related to said radiating elements to additively provide a composite signal of substantially constant amplitude, said time varying amplitude components sequentially related to operatively effect movement of the electrical phase center of said composite signal about said central region; said composite signal adapted to coact with stationary reflector means having a principal axis passing through said central region, whereby movement of said composite signal about said central region effects corresponding conical scan; said wave signal also including a constant amplitude component; means estabishing a ratio between said constant amplitude component and said time varying component, whereby the movement of said electrical phase center is selectively controlled about said principal axis; said amplitude modulating means including a circular guide means supporting a first and second mode of wave signal propagation; said first mode characterized as having a variation in radial field with circumferential angular position; said second mode being characterized as having a constant radial field with variation in circumferential angular position; means rotating said circular guide means relative to end aperture means of said connecting guide means; said end aperture means coupled to angularly separated circumferential regions of said circular guide means to obtain an amplitude modulated component and constant magnitude component of said wave signal from said first and second modes respectively.

2. The conical scan antenna system of claim 1 wherein said first and second modes comprise the $TE_{11}$ and $TM_{01}$ modes respectively.

3. A rotating signal focus for a scan antenna system comprising a plurality of radiating elements fixedly positioned about a focal axis; each of said radiating elements including a longitudinal axis extending substantially parallel to said scan axis; each of said longitudinal axis intersecting a common plane substantially perpendicular to said focal axis; the intersected point of each of said longitudinal axis and common planes angularly separated by equal amounts; connecting means presenting a wave signal to each of said radiating elements; each of said wave signals including a time varying amplitude modulated component; the amplitude modulated component of respective ones of said radiating elements being sequentially separated to correspond to the angular separation of their associated radiating elements; said wave signals additively establishing a composite signal of substantially constant amplitude; the phase center of the component signal rotating about said focal axis; reflective means having a principal axis coinciding with said focal axis, whereby movement of said composite signal effects corresponding conical scan; said amplitude modulating means including a circular guide means supporting a first and second mode of wave signal propagation; said first mode characterized as having a variation in radial field with circumferential angular position; said second mode being characterized as having a constant radial field with variation in circumferential angular position; means rotating said circular guide means relative to end aperture means of said connecting guide means; said end aperture means coupled to angularly separated circumferential regions of said circular guide means to obtain an amplitude modulated component and constant magnitude component of said wave signal from said first and second modes respectively.

4. A rotating signal focus for a scan antenna system comprising a plurality of radiating elements fixedly positioned about a focal axis; each of said radiating elements including a longitudinal axis extending substantially parallel to said scan axes; each of said longitudinal axes intersecting a common plane substantially perpendicular to said focal axis; the intersected point of each of said longitudinal axis and common planes angularly separated by equal amounts; connecting means presenting a wave signal to each of said radiating elements; each of said wave signals including a time varying amplitude modulated component; the amplitude modulated component of respective ones of said radiating elements being sequentially separated to correspond to the angular separation of their associated radiating elements; said wave signals additively establishing a composite signal of substantially constant amplitude; the phase center of the component signal rotating about said focal axis; reflective means having a principal axis coinciding with said focal axis, whereby movement of said composite signal effects corresponding conical scan; said radiating element comprising four identically constructed horns symmetrically positioned to form a rectangular cluster; the amplitude varying component of respective ones of said horns having a 90° separation; said first and second wave signals comprising $TE_{11}$ and $TM_{01}$ modes respectively.

References Cited by the Examiner
UNITED STATES PATENTS

| | | | |
|---|---|---|---|
| 2,430,568 | 11/43 | Hershberger | 343—777 |
| 2,878,471 | 3/59 | Butler | 343—754 |
| 2,988,741 | 6/61 | Brown | 343—754 |
| 3,008,142 | 11/61 | Saltzman | 343—777 |
| 3,026,513 | 3/62 | Kurtz | 343—779 |

HERMAN KARL SAALBACH, *Primary Examiner.*